(12) United States Patent
Walker et al.

(10) Patent No.: US 11,734,071 B2
(45) Date of Patent: Aug. 22, 2023

(54) MEMORY SUB-SYSTEM TIER ALLOCATION

(71) Applicant: Micron Technology, Inc., Boise, ID (US)

(72) Inventors: Robert M. Walker, Raleigh, NC (US); Paul Rosenfeld, Rockville, MD (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/464,546

(22) Filed: Sep. 1, 2021

(65) Prior Publication Data

US 2023/0066106 A1 Mar. 2, 2023

(51) Int. Cl.
*G06F 9/50* (2006.01)
*G06F 12/12* (2016.01)

(52) U.S. Cl.
CPC ............ *G06F 9/5016* (2013.01); *G06F 12/12* (2013.01); *G06F 2212/1021* (2013.01)

(58) Field of Classification Search
CPC . G06F 9/5016; G06F 12/12; G06F 2212/1021
USPC .......................................................... 711/159
See application file for complete search history.

(56) References Cited

U.S. PATENT DOCUMENTS

| | | | |
|---|---|---|---|
| 2010/0121828 A1* | 5/2010 | Wang | G06F 16/188 |
| | | | 707/694 |
| 2017/0220592 A1* | 8/2017 | Foltz | G06F 3/067 |
| 2019/0155750 A1 | 5/2019 | Wang et al. | |
| 2020/0310957 A1 | 10/2020 | Sane et al. | |
| 2021/0081129 A1* | 3/2021 | Tian | G06F 3/067 |
| 2021/0081318 A1 | 3/2021 | Akel et al. | |
| 2021/0224200 A1 | 7/2021 | Gupta et al. | |
| 2021/0266362 A1 | 8/2021 | Lintz et al. | |

* cited by examiner

*Primary Examiner* — Edward J Dudek, Jr.
*Assistant Examiner* — Sidney Li
(74) *Attorney, Agent, or Firm* — Brooks, Cameron & Huebsch, PLLC (57) ABSTRACT

A method includes allocating, via a tier allocation component, a first portion of data to a first tier memory component and writing the first portion of data to the first tier memory component in response to a first tier free list having an available entry. The method further includes evicting a second portion of data from the first tier memory component in response to the first tier free list being empty when the first portion of data is allocated to the first tier memory component and writing the first portion of data to the first tier memory component in response to evicting the second portion of data.

20 Claims, 5 Drawing Sheets

MEMORY SUB-SYSTEM TIER ALLOCATION

TECHNICAL FIELD

Embodiments of the disclosure relate generally to memory sub-systems, and more specifically, relate to memory sub-system tier allocation.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to memory sub-system tier allocation, in particular to memory sub-systems that include a memory sub-system tier allocation component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory sub-system can include a number of tiers of memory, such as first tier memory that includes volatile memory (e.g., DRAM), second tier memory that includes non-volatile memory (e.g., storage class memory (SCM), and a backing store (e.g., non-volatile memory, such as NAND). The first tier memory can be used for kernel space and/or first tier user space. The second tier memory can be used for second tier user space. The backing store can be used to swap data between the first tier and second tier memory as data in the memory sub-system becomes hot or cold. The backing store is not addressable by the host system and accesses to the backing store are controlled by the memory sub-system controller and the tier allocation component.

Some approaches allocate data initially to the first tier of memory and then as the first tier of memory gets filled data is moved to the second tier and then as the second tier memory is filled data is moved to the backing store. Data can then be moved between the first tier memory, second tier memory, and/or the backing store as data become hot or cold. This data allocation process is limited based on the requests from a host system affecting hotness or coldness of the data and the memory sub-system does not control where data is allocated in the memory sub-system.

Aspects of the present disclosure address the above and other deficiencies by allocating data to the first tier memory and/or the second tier memory based on allocation prioritization and the status of a first tier free list, a first tier active list, a first tier inactive list, a first tier victim list, a second tier free list, a second tier active list, and a second tier inactive list. Data can be prioritized for allocation to the first tier memory where data is allocated to the first tier when the first tier free list has an available entry and if the first tier free list does not have an available entry data from the victim list can be moved to the second tier so that the data allocated to the first tier can be written to the first tier.

Data can be prioritized for allocation to either the first or the second tier where data is allocated to the first tier when the first free list has an available entry and data is allocated to the second tier when the first free list does not have an available entry and the second tier free list has an available entry. When the first tier free list and the second tier free list both do not have an available entry, data can be allocated to the first tier and data from the victim list can be moved to the second tier so that the data allocated to the first tier can be written to the first tier.

Data can be prioritized for allocation to the second tier where data is allocated to the second tier when the second tier free list has an available entry and data is allocated to the first tier when the second tier free list does not have an available entry and the first tier free list has an available entry. When the second tier free list and the first tier free list both do not have an available entry, data can be allocated to the second tier and data from the second tier inactive list can be moved to the backing store so that the data allocated to the second tier can be written to the second tier.

Data can be prioritized for allocation to the second tier where data is allocated to the second tier when the second free list has an available entry. When the second tier free list does not have an available entry, data can be allocated to the second tier and data from the second tier inactive list can be moved to the backing store so that the data allocated to the second tier can be written to the second tier.

Once data has been allocated and written to the allocated tier, data can migrate between the first tier, second tier, and backing store based on the hotness or coldness of the data.

Figure 1:
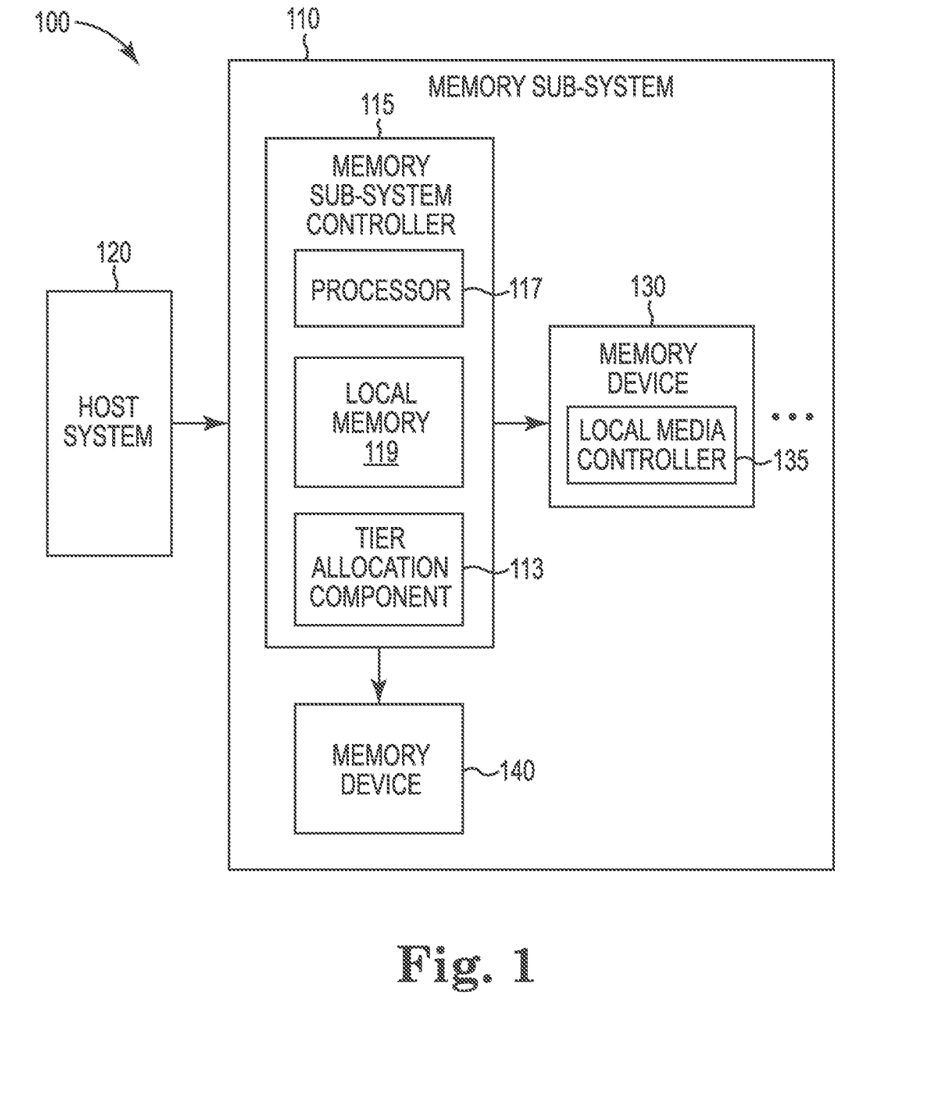
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a tier allocation component 113. Although not shown in FIG. 1 so as to not obfuscate the drawings, the tier allocation component 113 can include various circuitry to facilitate allocating data to memory tiers for a memory sub-system and/or components of the memory sub-system, determining where to allocate data for the memory sub-system and/or components of the memory sub-system based on allocation priority of the memory sub-system and/or components of the memory sub-system, and/or generating, updating, and monitoring free lists, active lists, inactive list, victim lists, and promotion lists for the memory sub-system and/or the components of the memory sub-system. In some embodiments, the tier allocation component 113 can include special purpose circuitry in the form of an ASIC, FPGA, state machine, and/or other logic circuitry that can allow the tier allocation component 113 to orchestrate and/or perform operations to selectively perform tier allocation operations for the memory device 130 and/or the memory device 140 based on allocation priority.

In some embodiments, the memory sub-system controller 115 includes at least a portion of the tier allocation component 113. For example, the memory sub-system controller 115 can include a processor 117 (processing device) configured to execute instructions stored in local memory 119 for performing the operations described herein. In some embodiments, the tier allocation component 113 is part of the host system 110, an application, or an operating system.

In a non-limiting example, an apparatus (e.g., the computing system 100) can include a memory sub-system tier allocation component 113. The memory sub-system tier allocation component 113 can be resident on the memory sub-system 110. As used herein, the term "resident on" refers to something that is physically located on a particular component. For example, the memory sub-system tier allocation component 113 being "resident on" the memory sub-system 110 refers to a condition in which the hardware circuitry that comprises the memory sub-system tier allocation component 113 is physically located on the memory sub-system 110. The term "resident on" can be used interchangeably with other terms such as "deployed on" or "located on," herein.

A memory sub-system tier allocation component can be configured to allocate a first portion of data to a first tier memory component in response to a first tier free list having an available entry and allocate the first portion of data to a second tier memory component in response to the first tier free list being empty and a second tier free list being empty. The tier allocation component can be configured to allocate a second portion of data to a first tier memory component in response to the first tier free list having an available entry and allocate the second portion of data to the first tier memory component in response to the first tier free list being empty and evicting a third portion of data from the first tier memory component to the second tier memory component.

The tier allocation component can be configured to allocate a fourth portion of data to the second tier memory component in response to a second tier free list having an available entry. The tier allocation component can be configured to allocate the fourth portion of data to the first tier memory component in response to the second tier free list being empty and a first tier free list having an available entry. The tier allocation component can be configured to allocate the fourth portion of data to the second tier memory component in response to the second tier free list being empty and evicting a fifth portion of data from the second tier memory component.

A memory sub-system tier allocation component can be configured to generate a promotion of list of a number of portions of data located on a backing store. The promotion list can be generated by polling a hot page detector that detects hot pages in the backing store that have been access within a particular time period and are ready for promotion to the first and/or second tier memory. The tier allocation component can promote a first portion of data indicated by the promotion list from the backing store to a second tier memory component in response to a second tier free list having an available entry. The tier allocation component can be configured to promote a portion of data on the promotion list by evicting a portion of data from the second tier memory component. The tier allocation component can be configured to create an entry in the second tier free list in response to evicting the portion of data from the second tier memory component. The tier allocation component can be configured to promote the portion of data on the promotion list from the backing store to the second tier memory component in response to the second tier free list having the entry.

Figure 2:
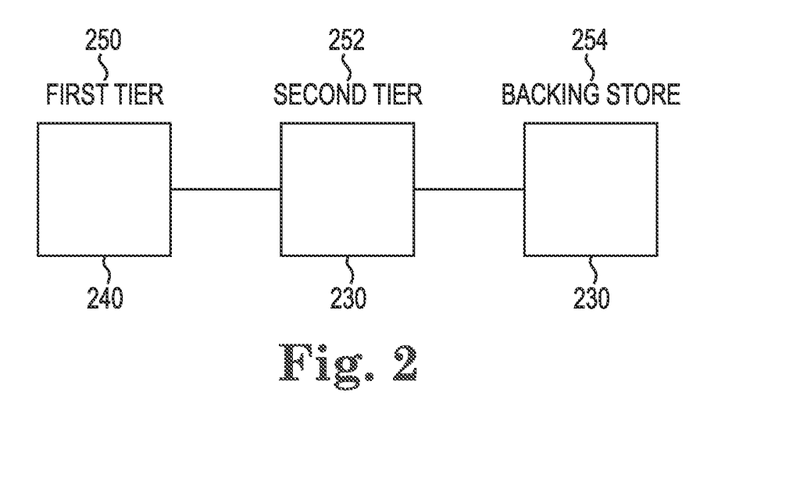
FIG. 2 illustrates an example computing system that includes a memory sub-system in accordance with some embodiments of the present disclosure.

FIG. 2 illustrates an example computing system that includes a memory sub-system in accordance with some embodiments of the present disclosure. A memory sub-system can include first tier memory 250 with memory device 240, such as a DRAM memory device, a second tier memory 252 with memory device 230, such as a SCM memory device, and a backing store with a memory device 230, such as a NAND SSD. First tier memory 250, second tier memory 252, and backing store 254 can include any combination of any number of memory devices 230 and 240. Data can be allocated to the first tier memory 250 and/or to second tier memory 252 by a tier allocation component based on an allocation priority.

Figure 3:
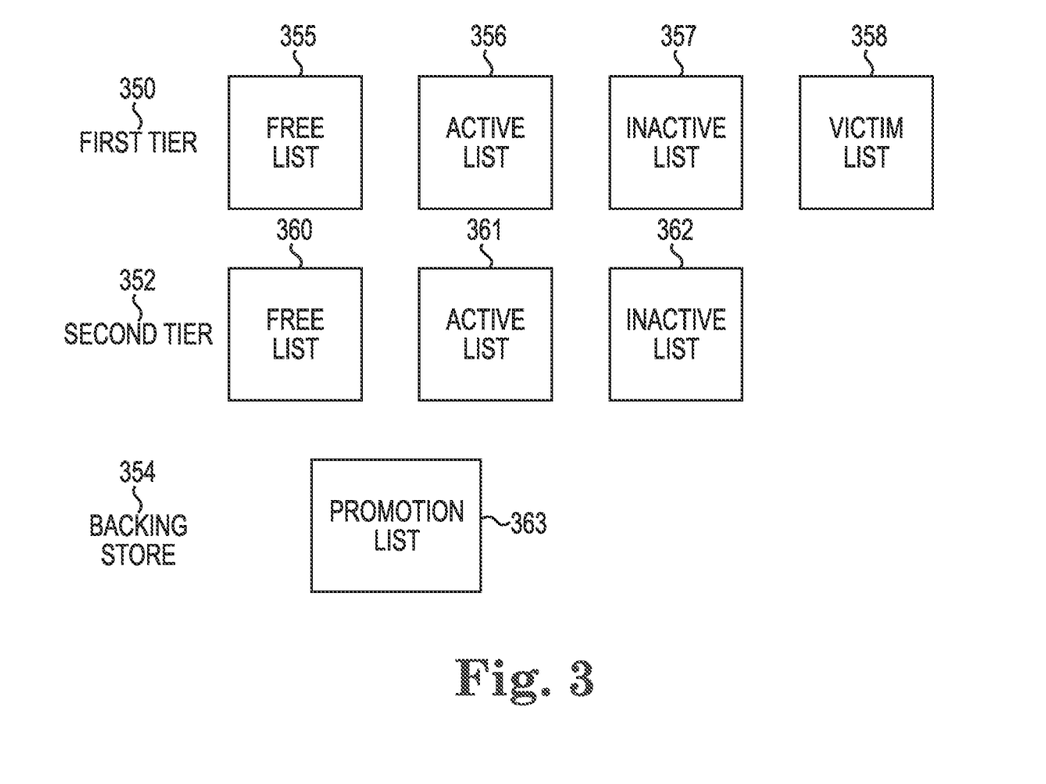
FIG. 3 is a block diagram corresponding to lists used for memory sub-system tier allocation in accordance with some embodiments of the present disclosure.

FIG. 3 is a block diagram corresponding to lists used for memory sub-system tier allocation in accordance with some embodiments of the present disclosure. A tier allocation component can generate, update, and monitor a number of lists used to allocate data. The tier allocation component can generate, update, and monitor a first tier free list 355, a first tier active list 356, a first tier inactive list 357, and a first tier victim list 358 for the first tier memory 350. The tier allocation component can generate, update, and monitor a second tier free list 360, a second tier active list 361, and a second tier inactive list 362 for the second tier memory 352. The tier allocation component can generate, update, and monitor a promotion list 363 for backing store 354. The first tier free list 355 can include a list of entries that indicate locations in the first tier memory 350 that are available for writing data in the first tier memory 350. The first tier active list 356 includes a list of entries that indicate locations in the first tier memory 350 that are storing hot data. The first tier inactive list 357 includes a list of entries that indicate locations in the first tier memory 350 that are storing cold data. For example, hot data is data that has been accessed within a particular time period and cold data is data has not been accessed within another particular time period. The first tier victim list 358 includes a list of entries that indicate location in the first tier memory 350 that are designated to be evicted from the first tier memory 350 when the first tier memory 350 is full and data has been allocated to the first tier memory 350. The first tier victim list 358 is generated using entries from the first tier inactive list 357.

The second tier free list 360 can include a list of entries that indicate locations in the second tier memory 352 that are available for writing data in the second tier memory 352. The second tier active list 361 includes a list of entries that indicate locations in the second tier memory 352 that are storing hot data. The second tier inactive list 362 includes a list of entries that indicate locations in the second tier memory 352 that are storing cold data. The promotion list 363 includes a list of entries that indicate locations in the backing store 354 that are storing hot data that is ready for promotion to the first tier memory 350 and/or second tier memory 352.

Figure 4A:
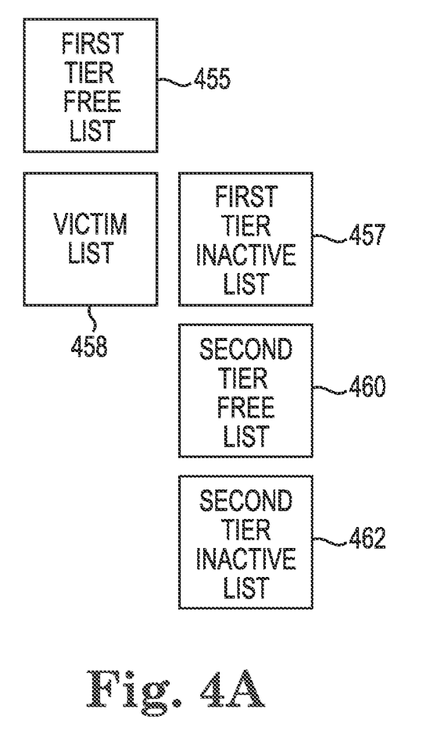
FIGS. 4A-4D are flow diagrams corresponding to methods for memory sub-system tier allocation in accordance with some embodiments of the present disclosure.

FIGS. 4A-4D are flow diagrams corresponding to methods for memory sub-system tier allocation in accordance with some embodiments of the present disclosure. FIG. 4A illustrates prioritizing data for allocation to the first tier memory. Data is allocated to the first tier when the first tier free list 455 has an available entry. If the first tier free list 455 does not have an available entry, data from the victim list 458 can be evicted from first tier memory and moved to a location indicated by the second tier free list 460 so that the data allocated to the first tier can be written to the first tier memory. If the second tier free list 460 does not have an available entry when evicting data in the victim list from first tier memory, data from the second tier inactive list 462 can be moved to the backing store so that the data in the victim list 458 evicted form the first tier memory to the second tier memory can be written to the second tier memory.

Figure 4B:
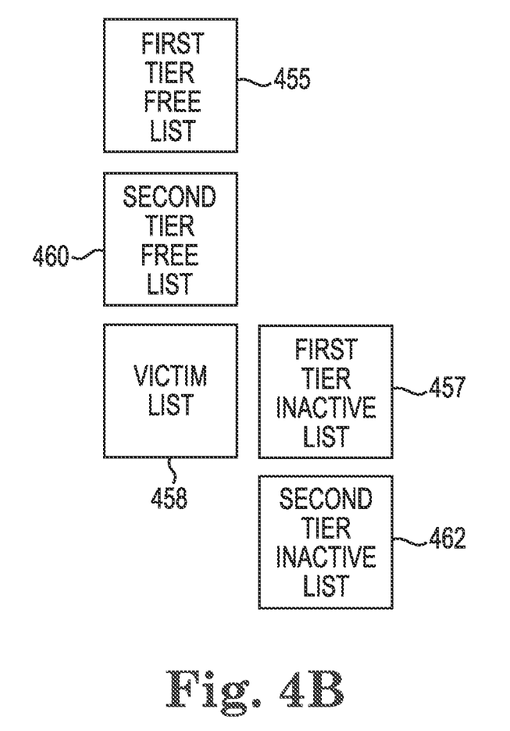

FIG. 4B illustrates prioritizing data for allocation to either the first or the second tier. Data is allocated to the first tier when the first tier free list 455 has an available entry. Data is allocated to the second tier when the first free list 455 does not have an available entry and the second tier free list 460 has an available entry. When the first tier free list 455 and the second tier free list 460 both do not have an available entry, data can be allocated to the first tier memory or the second tier memory. When the first tier free list 455 and the second tier free list 460 both do not have an available entry, data can be allocated to the second tier memory by evicting data in the second tier inactive list 462 from second tier memory and moving the evicted data to a location in the backing store, allowing for data to be allocated and written to the second tier memory. When the first tier free list 455 and the second tier free list 460 both do not have an available entry, data can be allocated to the first tier memory by evicting data in the second tier inactive list 462 from second tier memory and moving the evicted data to a location in the backing store and by evicting data in the victim list 458 and/or first tier inactive list 457 from first tier memory and moving the evicted data to a location in the second tier memory where data was evicted to the backing store, allowing for data to be allocated and written to the first tier memory.

Figure 4C:
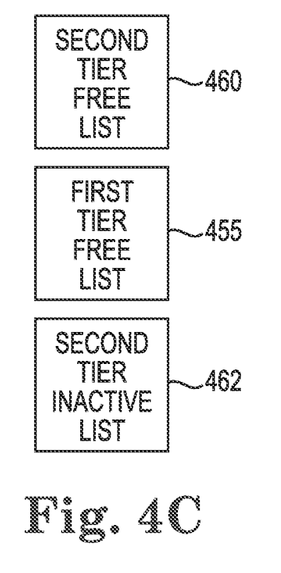

FIG. 4C illustrates prioritizing data for allocation to the second tier. Data is allocated to the second tier when the second tier free list 460 has an available entry. Data is allocated to the first tier when the second tier free list 460 does not have an available entry and the first tier free list 455 has an available entry. When the second tier free list 460 and the first tier free list 455 both do not have an available entry, data can be allocated to the second tier. Data from the second tier inactive list 462 can be evicted from the second tier memory to the backing store so that the data allocated to the second tier can be written to the second tier memory.

Figure 4D:
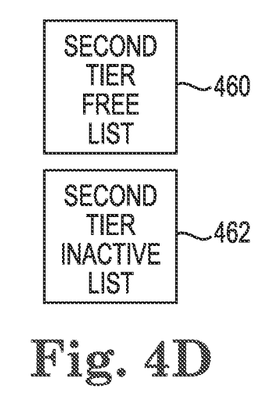

FIG. 4D illustrates prioritizing data for allocation to the second tier. Data is allocated to the second tier when the second tier free list 460 has an available entry. When the second tier free list 460 does not have an available entry, data can be allocated to the second tier and data from the second tier inactive list 462 can be evicted from the second tier memory to the backing store so that the data allocated to the second tier can be written to the second tier memory.

Figure 5:
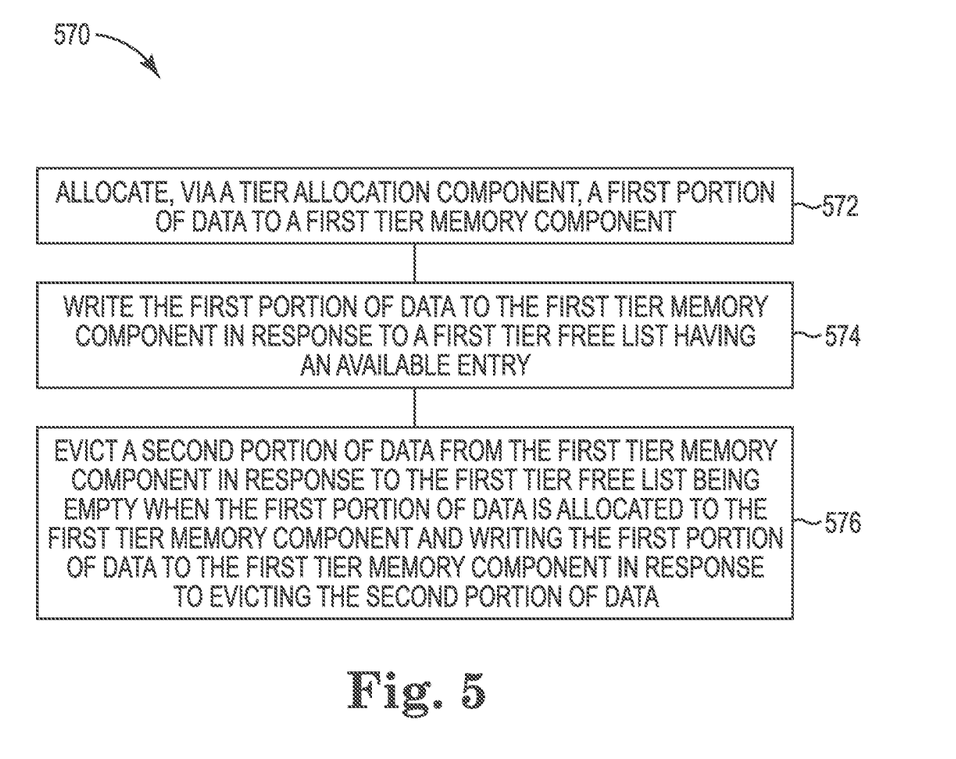
FIG. 5 is a flow diagram corresponding to a method for memory sub-system tier allocation in accordance with some embodiments of the present disclosure.

FIG. 5 is a flow diagram corresponding to a method 570 for tier allocation in accordance with some embodiments of the present disclosure. The method 570 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 570 is performed by the tier allocation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 572, a first portion of data is allocated to a first tier memory component via a tier allocation component. In some embodiments, the memory sub-system can be analogous to the memory sub-system 110 illustrated in FIG. 1.

At operation 574, the first portion of data is written to the first tier memory component in response to a first tier free list having an available entry. At operation 576, a second portion of data is evicted from the first tier memory component in response to the first tier free list being empty when the first portion of data is allocated to the first tier memory component and writing the first portion of data to the first tier memory component in response to evicting the second portion of data.

In some embodiments, the method 570 can include allocating a third portion of data to a second tier memory component in response to the first tier free list being empty and a second tier free list having an available entry and allocating the third portion of data to the second tier memory component in response to the second tier free list being empty.

In some embodiments, the method 570 can include evicting a fourth portion of data from the first tier memory component in response to the second tier free list being empty when the third portion of data is allocated to the first tier memory component and writing the third portion of data to the first tier memory component in response to eviting the fourth portion of data In some embodiments, the method 570 can include allocating a fifth portion of data to a second tier memory component in response to a second tier free list having an available entry, allocating the fifth portion of data to the first tier memory component in response to the second tier free list being empty and the first tier free list having an available entry, and allocating the fifth portion of data to the second tier memory component in response to the second tier free list being empty and the first tier free list being empty and evicting a sixth portion of data from the second tier memory component to a backing store.

In some embodiments, the method 570 can include allocating a seventh portion of data to a second tier memory component in response to a second tier free list having an available entry and allocating the seventh portion of data to the second tier memory component in response to the second tier free list being empty and evicting an eighth portion of data from the second tier memory component to a backing store.

Figure 6:
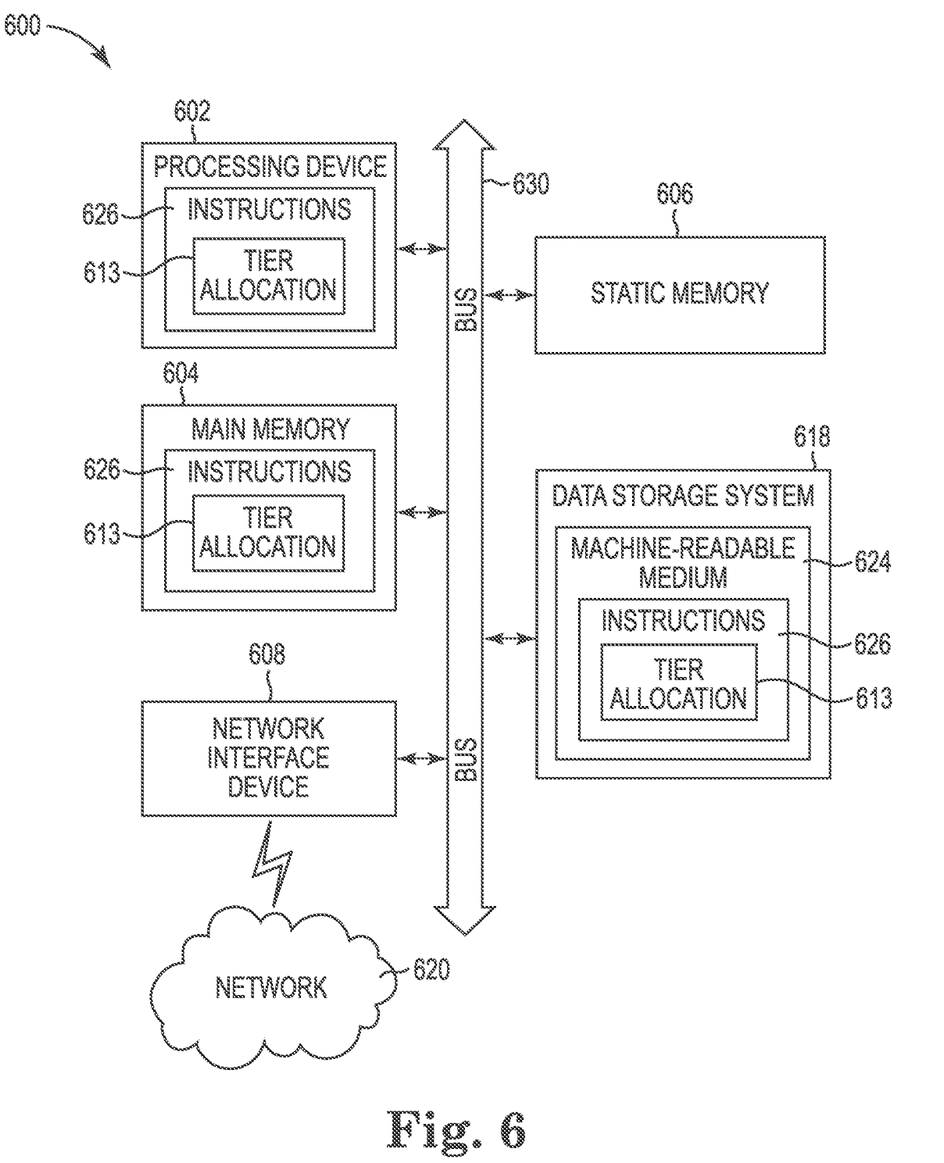
FIG. 6 is a block diagram of an example computer system in which embodiments of the present disclosure may operate.

FIG. 6 is a block diagram of an example computer system 600 in which embodiments of the present disclosure may operate. For example, FIG. 6 illustrates an example machine of a computer system 600 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the tier allocation component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a tier allocation component 613 (e.g., the tier allocation component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   determining a status of a second tier free list associated with a second tier memory component;
   allocating, via a tier allocation component, a first portion of data to a second tier memory component in response to determining the status of the second tier free list as having an available entry;
   writing the first portion of data to the second tier memory component in response to allocating the first portion of data to the second tier memory component;
   determining the status of the second tier free list associated with the second tier memory component and a status of a first tier free list associated with the first tier memory component;
   allocating, via a tier allocation component, the first portion of data to a first tier memory component in response to determining the status of the second tier free list as being empty and determining the status of the first tier free list as having an available entry;
   writing the first portion of data to the first tier memory component in response to allocation the first portion of data to the first tier memory component;
   determining the status of the second tier free list associated with the second tier memory component and a status of a first tier free list associated with the first tier memory component;
   allocating, via a tier allocation component, the first portion of data to the second tier memory component in response to determining the status of the second tier free list as being empty and determining the status of the first tier free list as being empty, evicting a second portion of data from the second tier memory component in response to determining the status of the second tier free list as being empty; and
   writing the first portion of data to the second tier memory component in response to evicting the second portion of data and allocating the first portion of data to the second tier memory component.

2. The method of claim 1, further comprising allocating a third portion of data to the second tier memory component in response to the first tier free list being empty and the second tier free list having an available entry.

3. The method of claim 2, further comprising allocating the third portion of data to the second tier memory component in response to the second tier free list being empty by evicting a fourth portion of data from the second tier memory component.

4. The method of claim 2, further comprising allocating a fifth portion of data to the first tier memory component in response to the first tier free list being empty and the second tier free list being empty by evicting a sixth portion of data from the second tier memory component and by evicting a seventh portion of data from the first tier memory component.

5. The method of claim 1, further comprising allocating an eighth portion of data to a second tier memory component in response to the second tier free list having an available entry.

6. The method of claim 5, further comprising allocating the eighth portion of data to the first tier memory component in response to the second tier free list being empty and the first tier free list having an available entry.

7. The method of claim 5, further comprising allocating the eighth portion of data to the second tier memory component in response to the second tier free list being empty and the first tier free list being empty and evicting a ninth portion of data from the second tier memory component to a backing store.

8. The method of claim 1, further comprising allocating a tenth portion of data to the second tier memory component in response to the second tier free list having an available entry.

9. The method of claim 8, further comprising allocating the tenth portion of data to the second tier memory component in response to the second tier free list being empty and evicting an eleventh portion of data from the second tier memory component to a backing store.

10. An apparatus, comprising:
a memory sub-system tier allocation component configured to:
determine a status of a first tier free list associated with a first tier memory component;
allocate a first portion of data to a first tier memory component in response to determining the status of the first tier free list as having an available entry;
determine the status of the first tier free list associated with the first tier memory component and a status of a second tier free list associated with a second tier memory component;
allocate the first portion of data to a second tier memory component in response to determining the status of the first tier free list as being empty and determining the status of the second tier free list as having an available entry;
determine the status of the first tier free list associated with the first tier memory component and the status of a second tier free list associated with a second tier memory component; and
allocate the first portion of data to the first tier memory component in response to determining the status of the first tier free list as being empty and determining the status of the second tier free list as being empty, wherein the first tier memory component evicts another portion of data from the first tier memory component to the second tier memory component in response to allocating the first portion of data to the first tier memory component.

11. The apparatus of claim 10, wherein the tier allocation component is configured to allocate a second portion of data to a first tier memory component in response to the first tier free list having an available entry; and allocate the second portion of data to the first tier memory component in response to the first tier free list being empty and evicting a third portion of data from the first tier memory component to the second tier memory component.

12. The apparatus of claim 10, wherein the tier allocation component is configured to allocate a fourth portion of data to the second tier memory component in response to a second tier free list having an available entry.

13. The apparatus of claim 12, wherein the tier allocation component is configured to allocate the fourth portion of data to the first tier memory component in response to the second tier free list being empty and a first tier free list having an available entry.

14. The apparatus of claim 12, wherein the tier allocation component is configured to allocate the fourth portion of data to the second tier memory component in response to the second tier free list being empty and evicting a fifth portion of data from the second tier memory component.

15. An apparatus, comprising:
a memory sub-system tier allocation component configured to:
generate a promotion of list of a number of portions of data located on a backing store that have been accessed within a particular time period; and
promote a first portion of data on the promotion list from the backing store to a second tier memory component in response to a second tier free list having an available entry; and
promote the first portion of data on the promotion list from the backing store to a second tier memory component in response to the second tier free list being empty, the second tier memory component evicting a second portion of data from the second tier memory component, and the second tier memory component creating a first entry in the second tier free list in response to evicting the second portion of data from the second tier memory component;
promote a third portion of data on the promotion list from the backing store to the second tier memory component in response to a first tier free list having an available entry, promoting a fourth portion of data from the second tier memory component to the first tier memory component, and creating a second entry in the second tier free list.

16. The apparatus of claim 15, wherein the tier allocation component is configured to generate the promotion list by polling a hot page detector.

17. The apparatus of claim 15, wherein the tier allocation component is configured to promote a fifth portion of data on the promotion list.

18. The apparatus of claim 17, wherein the tier allocation component is configured to promote the fifth portion of data on the promotion list by evicting a sixth portion of data from the second tier memory component.

19. The apparatus of claim 18, wherein the tier allocation component is configured to create a third entry in the second tier free list in response to evicting the sixth portion of data from the second tier memory component.

20. The apparatus of claim 19, wherein the tier allocation component is configured to promote the fifth portion of data to the second tier memory component in response to the second tier free list having the third entry.

* * * * *